Dec. 27, 1966    G. L. FRASER ETAL    3,294,517
FOREHEARTH CONSTRUCTION

Filed Feb. 11, 1963    3 Sheets-Sheet 1

INVENTORS
GEORGE L. FRASER
THEODORE F. PIEL
BY J.R. Nelson &
W.A. Schaich
ATTORNEYS

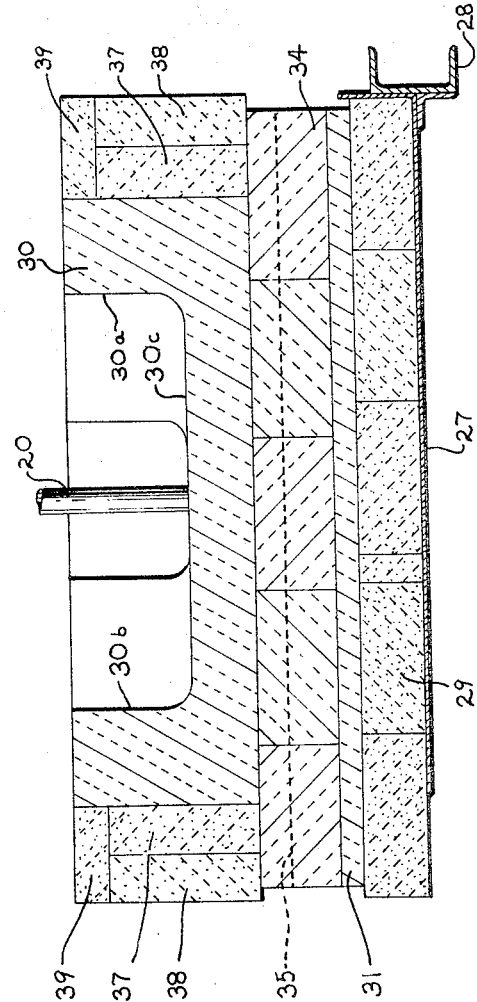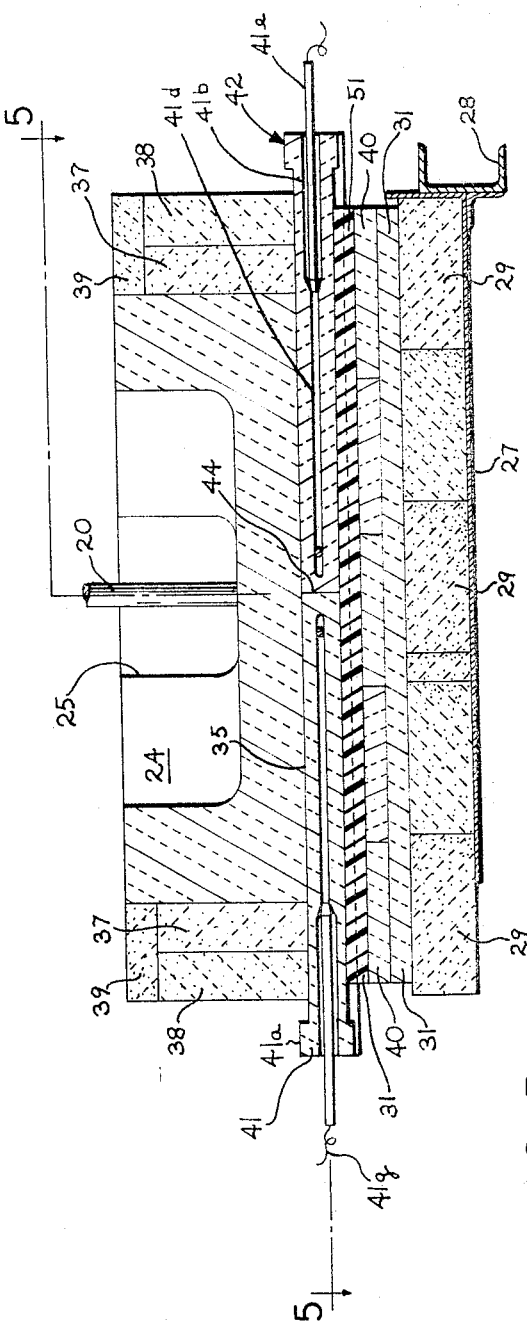

INVENTORS
GEORGE L. FRASER
THEODORE F. PIEL
BY J. R. Nelson &
W. A. Schaich
ATTORNEYS United States Patent Office 3,294,517
Patented Dec. 27, 1966

3,294,517
FOREHEARTH CONSTRUCTION
George L. Fraser, Oakland, Calif., and Theodore F. Piel, Toledo, Ohio, assignors to Owens-Illinois Inc., a corporation of Ohio
Filed Feb. 11, 1963, Ser. No. 257,680
6 Claims. (Cl. 65—346)

The present invention relates to the art of glass manufacturing and more particularly to an improved forehearth construction.

The present invention has its most particular application in the forehearth construction embodying a cooling section and a conditioning section; the latter serving to impart to the glass its final physical and temperature characteristics as it is to enter the delivery chamber where, for example, a gob may be formed as a preliminary step in the manufacture of glass containers generally. Thus, the forehearth construction to which the invention most particularly relates is that forehearth which conveys the glass from a refiner to the delivery pot or chamber. Cooling and subsequent conditioning of glass in such a forehearth is necessary and desirable since several gob forming machines of differing "pulls" may be served by the same refiner, placing consequently differing loads on the individual cooling and conditioning forehearth sections. Thus, one forming machine may be forming a rather small container, whereas the other forming machine may be forming a jug requiring a considerable weight and quantity of glass by comparison.

It is generally recognized that in view of the differing load requirements or, as commonly referred to, tons pulled per day, that difficulties are frequently encountered in the forming operation. This is usually traceable to a phenomena referred to as a vertical temperature gradient within the forehearth containing the cooling and conditioning sections. The vertical temperature gradient is simply an observable temperature differential between the "top" glass which is closest to the firing flame projected out from the sides over the top of the glass, and the temperature of the "bottom" glass proximate the bottom of the refractory. At the latter interface, considerable heat loss is observed. This phenomena evidences itself in difficulty of forming in terms of a variance in the weights of the gob and a variance in the temperature through the gob. The problem is particularly acute in certain "double gob" operations where it is found, due to this vertical temperature gradient, that temperature concentricity is lacking, resulting in gob curling.

Another manifestation accompanying vertical temperature gradient is the presence of surface cords, or what is commonly referred to as "mares tails." It is also recognized that the low thermal conductivity of glass exaggerates the effect since heat is being applied at the surface, increasing the temperature of the top glass, while heat is being lost at the bottom wall glass interface.

In an effort to overcome the problems accompanying pronounced vertical temperature gradients in the cooling and conditioning sections of the forehearth, there have been employed several schemes, none of which have been particularly successful since they have been found to be accompanied by other problems almost as serious. One scheme for overcoming vertical temperature gradient is the employment of mixing devices, stirrers, dams and the like in an effort to pull the cooler "bottom" glass up and the hotter "top" glass down. This is relatively unsuccessful because the use of such stirrer elements is accompanied by refractory particles breaking off or outright breakage thereof. Furthermore, seeds and blisters can be created. All of the foregoing are undesirable in the forehearth sections just prior to delivery to the gob forming apparatus.

Attempts have also been made to overcome the vertical temperature gradient by the employment of electrodes immersed in the flowing glass stream. In such installations adjacent pairs of electrode carry the current and serve as a resistance whereby the glass therebetween will be heated up by o-called "joul" effect. Unfortunately, there are a number of drawbacks to this technique. Thus, usually the path of the electric current through the glass is one of least resistance and, accordingly, the current will flow through the glass which is already the hottest, whereby no heating of the cooler glass is effected. This can only be overcome by very complicated design techniques which are not too successful since the temperature gradient will usually vary from time to time, requiring an accommodating, flexible and, therefore, expensive arrangement. Furthermore, the use of electrode heating just prior to forming is undesirable since seeds, blisters and other defects may be created or existing ones multiplied, leading to defective ware. Lastly, the furnace construction requiring protection against leaks, etc., which are necessarily attendant the use of electrode heating, is so complicated and expensive that such does not warrant their employment.

With the foregoing introduction and statement of understandings, it is a general object of the present invention to provide a novel furnace forehearth construction which overcomes the above-enumerated problems normally attendant the vertical temperature gradient phenomena encountered in the forehearth cooling and conditioning sections located just prior to the delivery chamber or gob-forming chamber.

It is another object of the present invention to provide such a forehearth construction where the heat loss of the bottom thereof is held to a minimum.

It is additionally an object of the present invention to provide such a forehearth construction in which the normal operating conditions thereof are conductive to a reduction in the formation of surface cords, e.g. "mares tails."

It is still another object of the present invention to provide such a forehearth construction which permits automated instrumentation and control techniques to be conveniently substituted for operator skill in the operation of the cooling and conditioning sections of the forehearth leading from the refiner to the delivery chamber.

It is a particular object of the present invention to provide a forehearth construction which is inclusive of heating means for heating up the bottom glass, whereby the usual temperature gradient in the vertical direction disappears or is substantially reduced to the end that the defects enumerated hereinabove, for all intents and purposes, are eliminated.

It is yet another object of the present invention to provide such a forehearth conditioning section which is of simple yet novel construction, permitting a considerable flexibility in operation and at the same time allowing necessary maintenance to be performed with a minimum of downtime since the operative elements of the furnace are readily accessible and removable if desired.

It is yet another object of the present invention to provide a forehearth conditioning section construction wherein heating provision is made, while at the same time the heating means, although readily accessible by maintenance personnel, are adequately and desirably protected against glass seepage which is sometimes encountered at the bottom of the forehearth wall.

The foregoing, as well as other objects of the present invention, will become apparent to those skilled in the art from the following detailed description taken in conjunction with the annexed sheets of drawings on which there is presented, for purposes of illustration only, several embodiments of the present invention.

In the drawings:

FIG. 3 is a sectional view taken on either the line 3—3 of FIG. 2 or line 3—3 of FIG. 5.

FIG. 4 is a sectional view taken on the line 4—4 of FIG. 5.

Viewed in its broadest scope, the present invention involves a forehearth construction comprising high-grade refractory blocks defining a glass contacting channel adapted to receive and convey molten glass along its length; said blocks being constructed and arranged to include a plurality of transverse passageways just beneath the molten glass forehearth bottom interface; said passageways containing a plurality of electrical resistance elements defining a right hand bank and a left hand bank whereby, as an electric current is impressed across the resistance elements, heat is generated which is sufficient to raise the temperature of the bottom glass near the channel interface, thereby substantially reducing or eliminating the vertical temperature gradient.

Another aspect of the present invention involves the solution of a problem encountered in the investigative phase of this invention. This problem involves the short life of the electric resistance element by reason of the glass leakage or seepage which shorts out the electric resistance element. This problem is very acute since the added heat lowers the viscosity of the glass near the bottom of the conditioning section, whereby it is prone to leak out even minor cracks, seams and imperfections in the lay-up of the refractory blocks forming the channel, the refractory insulation surrounding the channel and the like. The foregoing problem has been overcome by the employment of a special electrical-resistance-element-containing refractory block element which is adapted to be slidingly received by the passageways referred to hereinabove.

Figure 1:
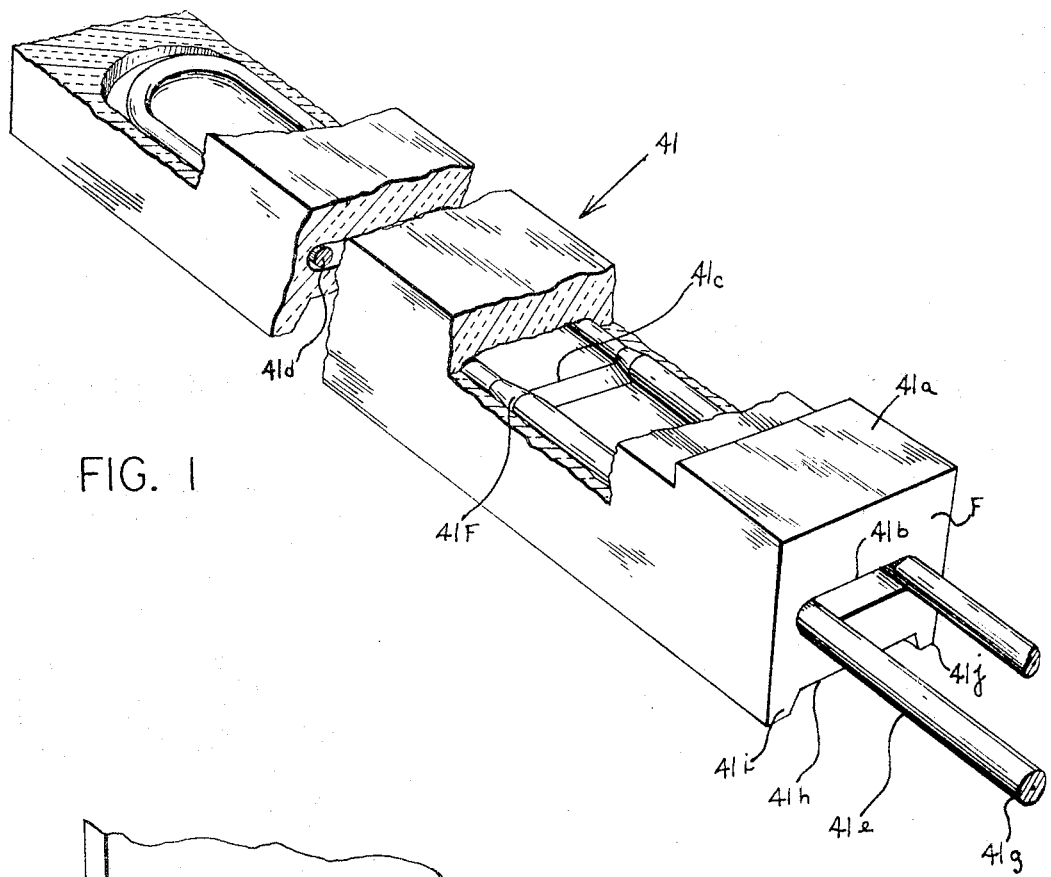
FIG. 1 is a perspective view, with a portion broken away, of one refractory block element of particular utility in the forehearth construction in accordance with the present invention.
Figure 2:
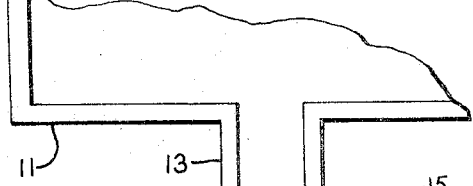
FIG. 2 is a partially broken schematic top plan view illustrating a glass furnace, a refiner and delivery chambers and the channels and forehearths connecting same.

The invention in toto, the details of construction involved in the invention and the interrelationship of the various elements making up the construction will be better understood from the following detailed description, and reference will first be had to FIG. 1.

In FIG. 1 there is shown a glass melting furnace 11 having a throat portion 13 leading to a refiner 15. The refiner 15 serves as a source of glass for three delivery sections represented by gob forming sections 17, 18 and 19. In these latter sections the gob forming plunger 20 is vertically reciprocable (although not shown) in an orifice (also not shown), and thereby adapted to form gobs of glass in sequence which pass on to a glass container forming machine, such as an IS machine or the like. Since these do not form a part of the present invention, no description beyond that given will be undertaken. Connecting the forming section 17 and the refiner 15 is the forehearth 21 which includes the cooling section 22 closest to the refiner and the conditioning section 23 closest to the delivery end. The conditioning section narrows down as at 24 to pass through a throat 25 leading to the delivery section 17. It may be mentioned here that the forehearth channel 21 is provided with a refractory roof and with side inwardly directed combustible-gas firing burners, although these have not been shown in the accompanying drawings for simplicity of illustration.

Figure 5:
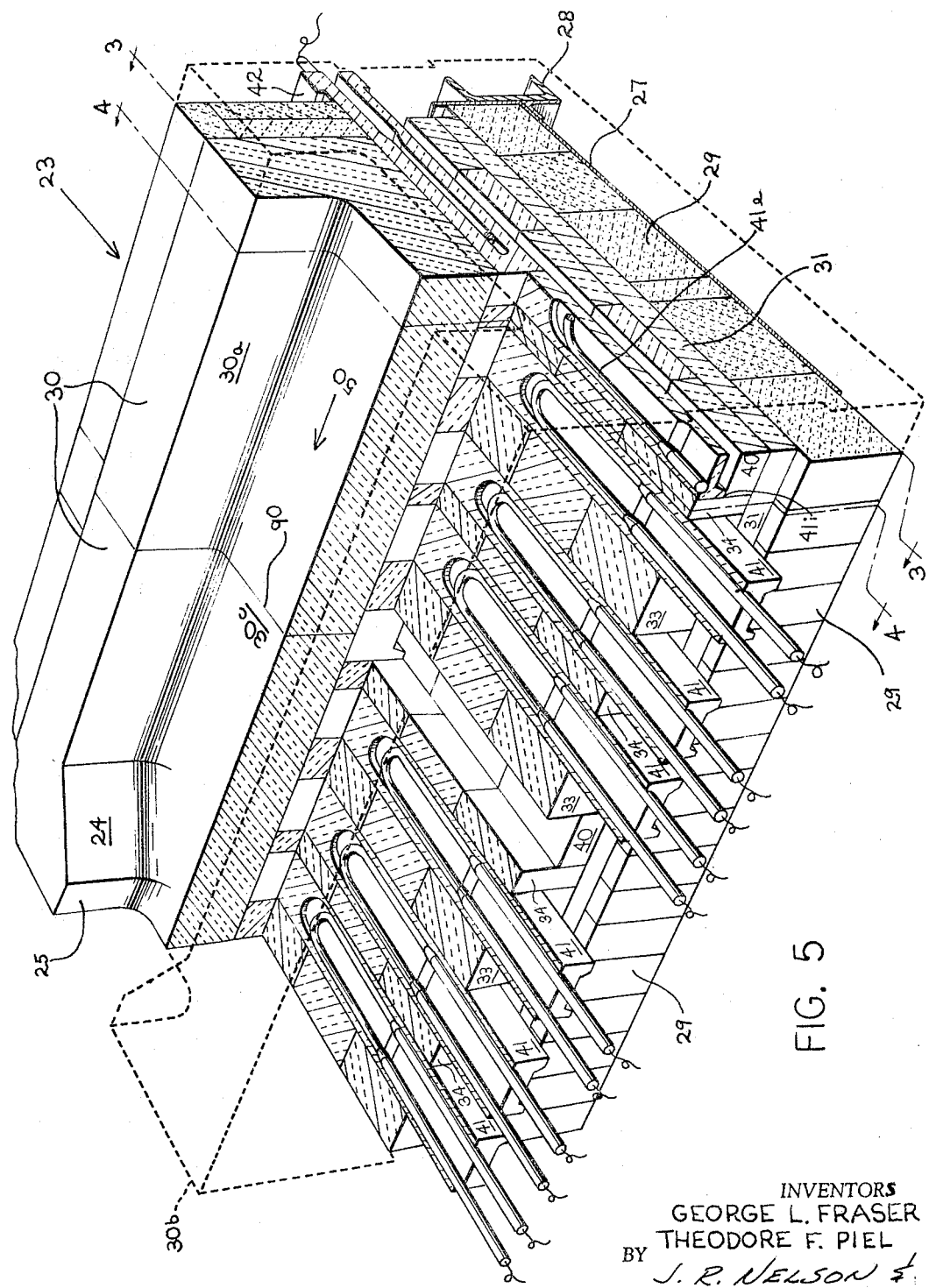
FIG. 5 is a partial perspective and partial sectional view of a conditioning section of a forehearth and taken substantially on the line 5—5 of FIG. 3.

The details of the construction of the conditioning section of the forehearth are shown best in FIGS. 3, 4 and 5. In constructing this section, use may be made of conventionally or commercially available refractory blocks and commercially sized blocks. In general, we employ a high-grade refractory in those portions of the forehearth which are either in direct contact with glass or which are likely to be contacted by glass, should some seepage or leakage occur beyond the primary channel member, identified by the reference numeral 30. These high-grade refractory blocks are of relatively heavy density and are generally highly resistant to the temperatures at which molten glass exists and are resistant to the erosive effects encountered in the movement of the glass and also resistant to the inherent corrosive nature of the molten glass itself. One such high-grade refractory material is sold under the tradename Monofrax M and is a product of Harbison-Carborundum Corporation of Falconer, New York. The material Monofrax M is essentially a fused cast aluminum oxide ($Al_2O_3$). Another high-grade refractory is cut Sillimanite, a product of Chas. Taylor & Sons, a subsidiary of National Lead Company of Cincinnati, Ohio. Sillimanite is essentially 62% aluminum oxide ($Al_2O_3$) and 35% silicon dioxide ($SiO_2$). Still another high-grade refractory is sold under the trade name Tamax 153, and is a product of Chas. Taylor & Sons, a subsidiary of National Lead Company of Cincinnati, Ohio. Tamax 153 is essentially slip cast Sillimanite (essentially 62% $Al_2O_3$, 35% $SiO_2$). We also employ in the furnace construction of this invention a somewhat lower grade refractory to form certain of the block elements. By lower grade refractory we mean one that is possessed of very desirable insulative characteristics, e.g. in the neighborhood of 2300°, but which is not quite as resistant of the erosive and corrosive charactertistics of the molten glass as it moves in its passage from the refinery to the delivery section. This type of refractory is generally less expensive than the former. The terms high-grade refractory and low-grade refractory will be used in the detailed description of the forehearth construction to follow, and they are to be understood as having the meanings indicated just hereinabove unless otherwise explained.

Referring now more specifically to FIGS. 3, 4 and 5, a metal casing 27 including the angle structure 28 supports a plurality of low-grade refractory blocks 29, forming an insulating layer to the heat of the molten glass conveyed or transported in the forehearth section involved. On top of the blocks 29 there is positioned in side by side relationship a plurality of high-grade refractory slabs 31. These slabs are of such size that each extends transversely across the forehearth supported by the blocks 29 to form a second heat barrier. Rows of blocks 33 and blocks 34 formed of high-grade refractory are situated on top of the slabs 31. The blocks 33 and 34 are equal in vertical thickness but the blocks 33 are somewhat wider (FIG. 5). The blocks being spaced apart in rows define a plurality of parallel passageways 35 which extend transversely all the way across the forehearth. The passageways are shown in dotted line in FIG. 4. Channel forming section 30 of high-grade refractory rest on top of the spacer blocks 33 and 34 and constitute the glass restraining elements of the forehearth construction. The channel forming sections 30 are formed to curve upwardly at their sides to form the right and left side walls of the furnace illustrated by the reference numerals 30a and 30b, respectively, having therebetween bottom surface 30c. Side wall 30b has been broken away and shown in dotted outline in FIG. 5 in the interest of showing other details of construction. The side wall portions of the channel slabs 30 are backed up by side by side blocks 37 and 38; the latter being topped by a facing block 39; all of which are formed of a relatively low-grade refractory.

A plurality of linear blocks 40 are situated within the passageway 35, resting on top of the layer of slabs of high-grade refractory identified by the reference numeral 31. The blocks 40 are fabricated to a vertical dimension less than that of the passageways 35; the space remaining being reserved for locating in each, a pair of elongated blocks formed of high-grade refractory; said blocks being situated with their ends abutting as at 44 (FIG. 3). Blocks on the left under side wall 30b are identified by the reference numeral 41, while blocks on the right under side wall 30a are identified by the reference numeral 42; these designations, right and left, being with reference to the direction of glass flow as illustrated by the arrow, identified by the reference numeral 50 in FIG. 5.

The high-grade refractory element blocks, identified by the reference numerals 41 and 42, are identical in construction and are snugly but slidingly received in the passageway 35 atop the linear blocks 40 and beneath the channel forming sections 30.

The high-grade refractory element block 41 may be seen in more detail by reference to FIG. 1. The element block 41 includes an upper flange portion 41a which as assembled (FIG. 3) is spaced from the refractory block 38, permitting one to gauge the distance that it has been inserted into the passageway. Block 41 includes a generally flat bore 41b which extends from its front face F interiorly almost to the opposite end. The bore 41b is necked down as at 41c to form a yet smaller flat bore as, for example, at 41d. The bore 41b receives a U-shaped electrical resistance heating element 41e; the two legs of which are narrowed down as at 41f. The electrical resistance heating element 41e is fitted with lead wires 41g which may be connected to a suitable source of electric current via a normal series or series parallel circuit inclusive of necessary transformers and the like sufficient to impress a voltage which will produce a rise in temperature in the element 41e and, correspondingly, in the bottom glass interface with the bottom wall section 30c. The element 41 is also provided with a recessed portion 41h which extends along its lowermost side, as viewed in FIG. 1, to define lateral legs 41i and 41j. These legs 41i and 41j rest upon the block 40, as shown in FIG. 5; leg 41j having been cut away by reason of the section taken, whereby the recess alongside the leg 41j is shown as occupied by quiescent air and may in fact create a barrier against heat loss downward, thus serving to force the heating effect of the electrical heating resistance element 41e upwardly in the direction of the bottom glass interface.

The assembly of the several blocks forming the forehearth conditioning section is such that the interface between laterally adjacent blocks are offset with respect to the interface of the blocks either thereabove or therebelow, creating in effect an extremely tortuous pathway for any molten glass which may attempt to flow downwardly between the interface or seam between laterally adjoining blocks. We employ, preferably, a refractory cement marketed under the trade name APG 265 by Richard C. Remmey Division of A. P. Green Firebrick Company of Philadelphia, Pennsylvania, at the seams and interfaces between adjoining blocks, thereby forming a refractory seal resistant to attack and penetration by the molten glass.

A somewhat varient embodiment is illustrated in part in FIG. 3 wherein we have employed a layer 51 of a plastic ramming mix in the passageway 35, and particularly just on top of the blocks 40. This plastic ramming mix material, identified by the reference numeral 51, extends laterally across the forehearth channel just beneath the element blocks 41 and 42 and serves to provide a cushion-like layer upon which the electric resistance element holding block 41 may rest. This material 51, in addition to forming a support for the element block 41, provides a measure of protection against thermal shock breakage since it has a degree of resilience permitting some expansion which, if the block were held tightly, might otherwise lead to cracking thereof. The plastic mix is a product of the Chas. Taylor & Sons, a subsidiary of National Lead Company of Cincinnati, Ohio.

It will be appreciated, particularly from FIGS. 3 and 5, that the electric resistance element holding blocks 41 and 42 may be conveniently and easily removed from the remainder of the forehearth construction. This may be desirable for purposes of repairing a glass leak or repairing a burned out block, slab or section. Furthermore, the electric resistance element 41e itself may be removed from the element block 41 or 42 by simply and carefully sliding it out. It will be appreciated that the lead wires 41g may be connected to any suitable source of current for developing the necessary current to produce the heat for elevating the temperature of the so-called "bottom" glass, thereby reducing or eliminating the vertical temperature gradient, as aforesaid.

As the electrical resistance heating element 41e, we have employed a heating element commercially marketed by the Kanthal Corporation of Sweden. These elements are known by the name of the producing corporation, namely, Kanthal heating elements.

A forehearth conditioning section, in accordance with the invention as disclosed herein and employing the features of construction illustrated in the drawings, has been found most desirable in that the vertical temperature gradient in front of the conditioning section remained essentially constant, regardless of the temperature gradient existing in the cooling section upstream therefrom. The weights and temperatures of gobs formed of glass after passage through the forehearth sections embodying this invention showed little or no variation, indicating extremely close agreement in the temperature of "top" and "bottom" glass.

As indicated hereinabove, a particular feature of the construction of the forehearth conditioning section in accordance with this invention involves the employment of the high-grade refractory elements 41 and 42. The use of such block as a holder for the electrical resistance heating element precludes any burn out or shorting type of stoppage due to any glass seepage or leakage down through the channel blocks 30 by reason of any porosity or voids therein or through the seam 90.

Modifications may be resorted to without departing from the spirit and scope of the present invention as defined in the appended claims.

We claim:

1. In a forehearth for conveying molten glass from a supply tank to a delivery section, or the like, the improved construction which comprises a plurality of block elements formed of a high-grade refractory constructed and arranged to define a channel inclusive of upstanding side walls and a bottom wall, said construction and arrangement further defining a plurality of passageways extending completely across said forehearth, said passageways being in parallel spaced relationship in a plane beneath said bottom wall and a plurality of high-grade refractory elements located in said passageways in slidable and removable relationship, said latter elements each having an elongate central bore containing an electrical resistance element in slidable and removable relationship, said resistance element being adapted when energized electrically to reduce the vertical temperature gradient of glass carried in said channel forehearth.

2. In a forehearth for conveying molten glass from a supply tank to a delivery section, or the like, the improved construction which comprises a plurality of block elements formed of a high-grade refractory constructed and arranged to define a channel inclusive of upstanding side walls and a bottom wall for retaining a moving mass of molten glass, said construction and arrangement further defining a plurality of passageways extending completely across said forehearth, said passageways being in parallel spaced relationship in a plane beneath said bottom wall and a plurality of high-grade refractory elements slidably and removably contained in said passageways, each extending substantially half way across said forehearth in and to end relationship, said latter elements each having an elongate central bore containing a slidably removable electrical resistance element adapted when energized electrically to reduce the vertical temperature gradient of glass carried in said channel forehearth.

3. In a forehearth for conveying molten glass from a refiner to a delivery section, said forehearth including a cooling section and a conditioning section, the improvement in said conditioning section which comprises a construction and arrangement of refractory elements definitive of a combination which includes a channel formed of high-grade refractory blocks adapted to contain said molten glass; a first plurality of blocks supportingly arranged beneath said channel in spaced rows leaving a plurality of transverse passageways of uniform cross section beneath said channel; a plurality of low-grade refractory blocks supportingly arranged about said channel and plurality of high-grade refractory blocks; and a plurality of opposed pairs of elongate high-grade refractory element bricks located one pair in each of said passageways end to end and in slidable and removable relationship, each of said bricks having a central bore in its outer end face, said bore extending interiorly short of the other end of said element brick and being adapted for slidable reception of and removal of an electric resistance heating element.

4. In a forehearth for conveying molten glass from a refiner to a delivery or feed chamber, said forehearth including a cooling section and a conditioning section, the improvement in said conditioning section which comprises a construction and arrangement of refractory elements definitive of a combination which includes (1) a channel formed of high-grade refractory blocks adapted to contain said molten glass; (2) a first plurality of support blocks beneath said channel, formed of high-grade refractory, said blocks being so arranged that the vertical interfaces are offset with respect to any seams in (1) and leaving a plurality of transverse passageways of uniform cross section beneath said channel; (3) a second plurality of support blocks disposed beneath the first plurality with the vertical interfaces offset with respect to those of the first plurality; (4) a plurality of low-grade refractory blocks supportingly arranged about said channel and plurality of high-grade refractory blocks with the vertical interfaces thereof offset with reference to vertical interfaces of (2) and (3); (5) a plurality of opposed pairs of elongate high-grade refractory element bricks located one pair in each of said passageways end to end and in slidable and removable relationship with opposite ends extending laterally beyond the blocks (4), each of said bricks having a central bore in the outer end face, said bore extending interiorly short of the other end of said element bricks; and (6) a plurality of electric resistance heating elements situated snugly and removably in each of said bores.

5. The improvement as claimed in claim 1, wherein said construction includes a formable refractory cement mix in said passageway lying beneath said elongate element blocks.

6. The improvement as claimed in claim 5, wherein said elongate element blocks each possess a recess extending along the lowermost face so as to define a pair of marginal linear legs.

References Cited by the Examiner
UNITED STATES PATENTS
2,707,353  5/1955  Honiss _____ 65—346
FOREIGN PATENTS
768,932  2/1957  Great Britain.

DONALL H. SYLVESTER, *Primary Examiner.*

D. CRUPAIN, *Assistant Examiner.*